United States Patent Office 2,916,118
Patented Dec. 8, 1959

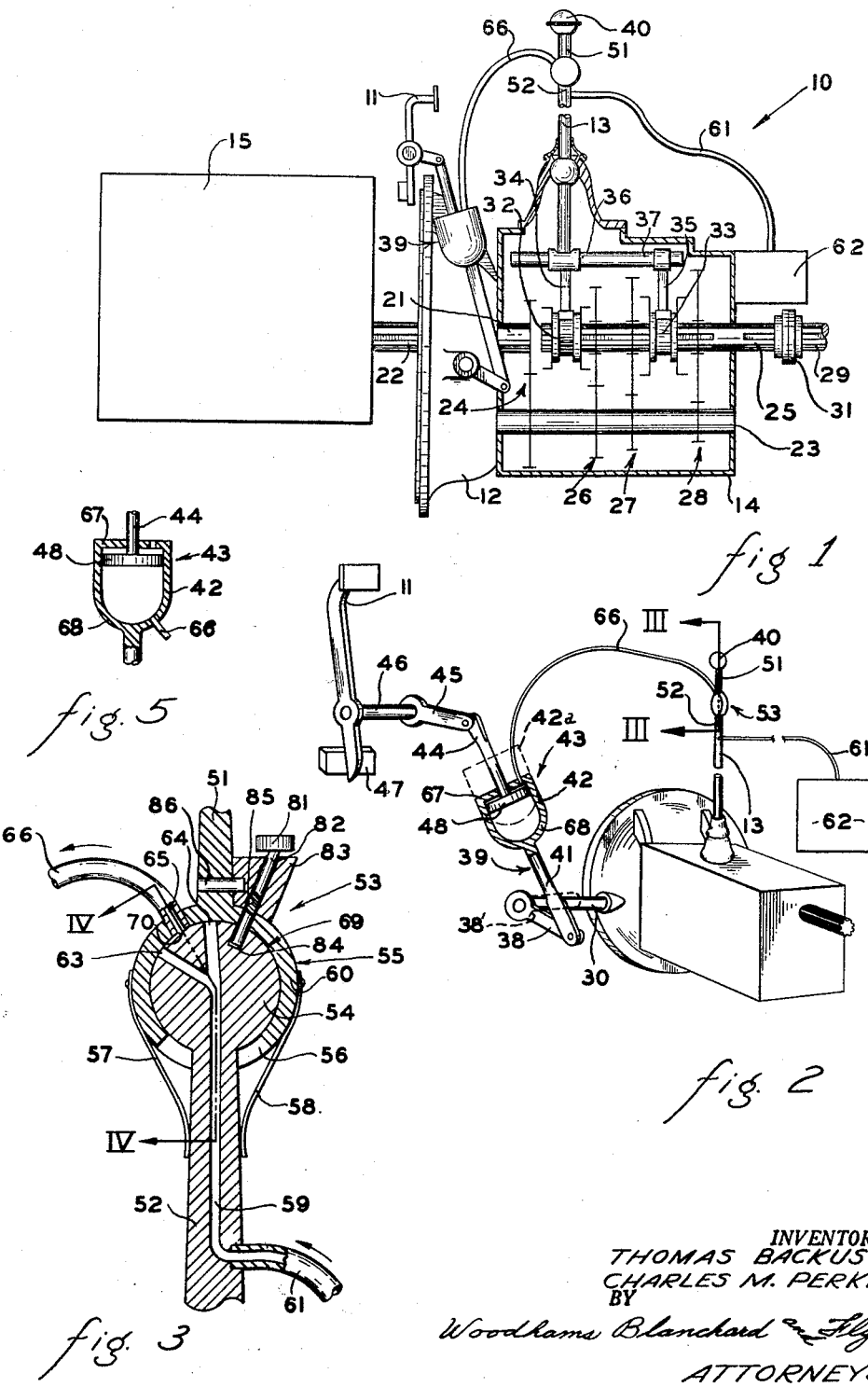

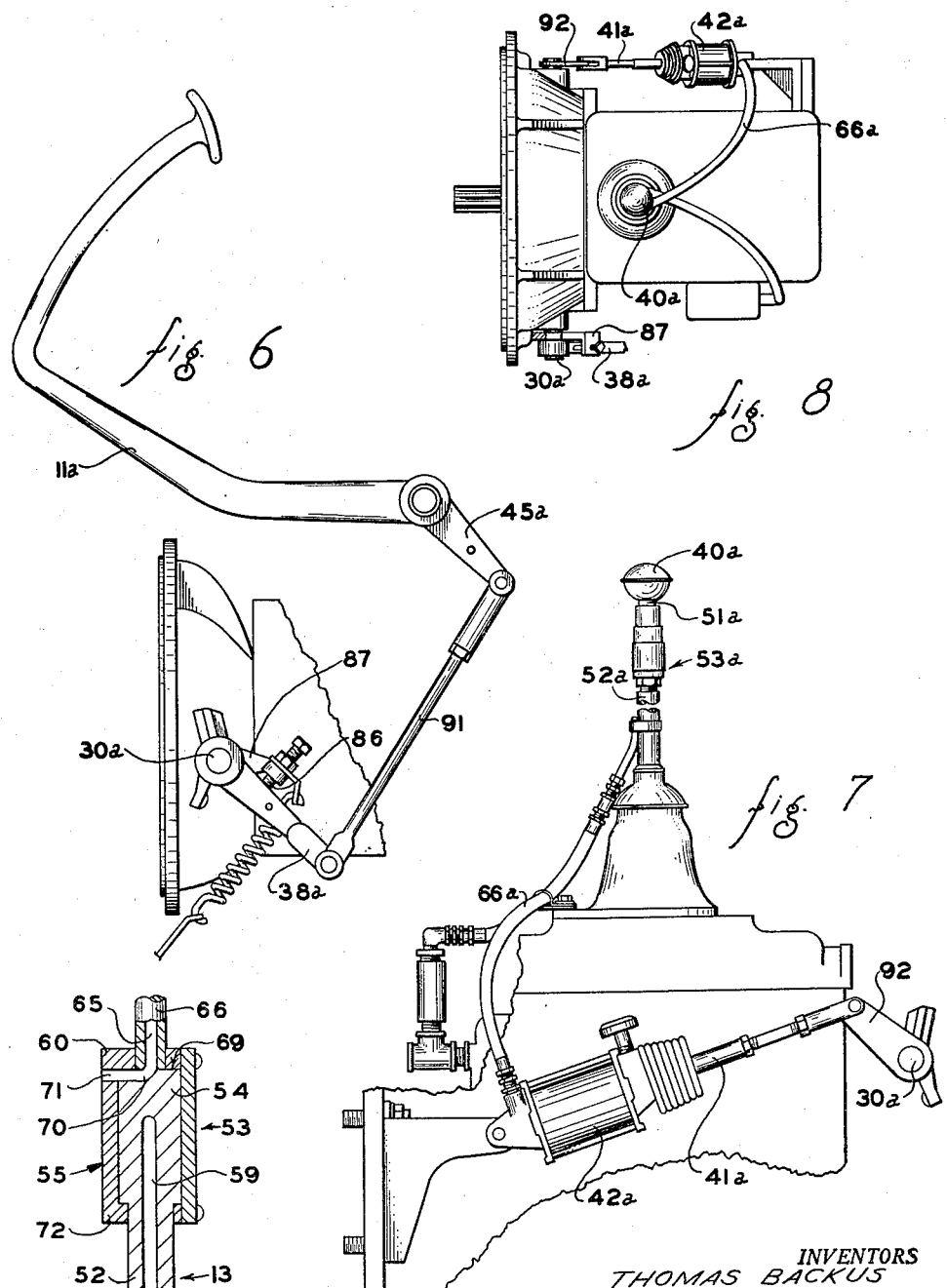

2,916,118

CLUTCH CONTROL SYSTEM

Thomas Backus and Charles M. Perkins, Kalamazoo, Mich., assignors, by mesne assignments, to Fuller Manufacturing Company, a corporation of Delaware Application June 19, 1956, Serial No. 592,384

12 Claims. (Cl. 192—3.5)

This invention relates to clutch operating mechanism and it relates particularly to clutch operating mechanism automatically actuable upon operation of a manually actuated shift lever, which mechanism also permits the clutch to be disconnected at the will of the operator by independent operation, at any time, of a clutch pedal.

In a constant attempt to diminish the effort and skill required of a driver in the operation of heavy duty power transmitting equipment, such as in trucks, earth moving equipment, cranes and similar equipment where power is transmitted at different speeds, there have been many efforts made in the past toward the development of both automatic and semiautomatic transmission gear shifting devices. In pursuing this objective, the effectiveness of automatic equipment has been developed to a high level, but thus far such units are available only at relatively high cost. Thus, there has long been a need for means by which change speed gears can be shifted in a manner which approaches as close as possible to the ideal of a completely automatic shifting apparatus and yet which can be provided at a relatively moderate cost.

In the conventional arrangement involving a manually shifted transmission and a pedally controlled clutch, considerable skill is required of the driver in coordinating his hand and foot movements required for a shifting operation. Further, over the course of an entire day of operation, considerable effort is expended by the driver in the foot movements required to shift gears, particularly in the operation of earth moving machinery or that of operating a truck in heavy traffic.

Accordingly, material progress would be made toward minimizing the effort and skill required of a driver, without involving costly, fully automatic equipment, if a mechanism could be developed wherein the clutch pedal is required to be operated only upon relatively few occasions, such as upon the starting of a vehicle from a standstill, and wherein the great majority of shifting operations are effected solely by the manual shift control lever.

While we are aware that many attempts have been made to provide such a mechanism, none of them to our knowledge have operated with the speed, certainty and smoothness of the apparatus of the present invention or, if they did, they required mechanism either of such delicacy as to require a high level of maintenance costs or they were of such complexity as to have too high an original cost.

In working out the solution of the above indicated problem, we have recognized that the so-called "feathering" of a clutch, namely, its gradual engagement to effect a smooth connection for rotative elements having widely different original speeds, is usually required only at the time of starting a vehicle from a standstill. Also, occasionally, as in working a truck around a dock, it is desired to permit clutch slippage and, hence, foot control is wanted here too. The remainder of the clutching operations, with ordinary care on the part of the driver, are usually effected between shafts already having approximately equal speeds and clutch engagement may, therefore, be in most instances effected without need or desire for clutch feathering or slippage. Therefore, we have provided inexpensive apparatus operable by and from the shift lever by which the clutch is quickly engaged or disengaged without feathering in normal operations, but we have also provided mechanism by which the driver may assert pedal control over the clutch whenever he wishes, as when feathering or clutch slipping is required.

Thus, we have provided a device available at an extremely low cost and capable of performing easily and automatically the great majority of clutch operating functions required in the normal operation of a heavy duty vehicle, which device still permits the driver to effect pedal operation of the clutch whenever desired, but which requires such pedal operation only in a relatively few instances so that no appreciable or undesirable effort is involved.

Accordingly, a major object of the invention has been to provide clutch controlling mechanism actuable in response to operation of a manually controlled shift lever.

A further object of the invention has been to provide a device, as aforesaid, in which the clutch pedal can assume control over the clutch separation at any time desired by the driver.

A further object of the invention has been to provide a device, as aforesaid, in which the shift lever includes a pair of relatively movable parts which will effect an initial movement at some point between the point at which manual force is applied to the lever for effecting a shift and the point at which force is in turn applied by the shift lever to the gear mechanism in response to the application of a shifting force to the shift lever, which initial movement may be utilized for energizing a pressure fluid system which in turn energizes the clutch releasing mechanism. Correspondingly, the release of pressure applied to said shift lever in a shifting direction will permit return operation of said relatively movable parts and thereby effect deenergization of the pressure fluid system and a return of the clutch to its engaged position.

A further object of the invention has been to provide a device, as aforesaid, which is usable with a standard, manually shiftable transmission.

A further object of the invention has been to provide a device, as aforesaid, which can be readily installed into an already existing truck having a pedally controlled clutch and a manually controlled transmission.

A further object of the invention has been to provide a device, as aforesaid, which is usable with a standard, manually shiftable transmission without the making of material changes in any of the existing truck parts.

A further object of the invention has been to provide a device, as aforesaid, which can be both built and installed into a truck at a relatively low cost.

A further object of the invention has been to provide a device, as aforesaid, which will be sufficiently rugged to be capable of operation under adverse conditions with a minimum of maintenance and yet which is sufficiently simple that, when maintenance is required, it can be effected inexpensively.

A further object of the invention has been to provide a device which will render automatic a great majority of the effort and skill requiring movements normally demanded of the operator in shifting the gears of a vehicle and which will do so at a cost sufficiently below the cost of fully automatic shifting equipment as to be available for a wide range of uses.

A further object of the invention has been to provide a device, as aforesaid, which when applied to over-the-road truck operations, or other operations where the vehicle is continuously moving, so minimizes the skill and effort required of the driver to shift the vehicle gears, that it provides a device very close to the operational desirability of an automatic transmission at only a small fraction of the cost thereof.

Other objects and purposes of the invention will be apparent to persons acquainted with equipment of this general type upon reading the following disclosure and inspecting the accompanying drawings, in which:

Figure 1 is a partially schematic, partially central cross-sectional view of a transmission system embodying the invention.

Figure 2 is a substantially diagrammatic view of a clutch control mechanism to which this invention relates.

Figure 3 is a sectional view taken along the line III—III of Figure 2.

Figure 4 is a sectional view taken along the line IV—IV of Figure 3.

Figure 5 is a fragment of Figure 2 disclosing an alternate structure.

Figure 6 is a fragmentary illustration of the clutch and linkage connecting the clutch to one end of a clutch pedal shaft, said structure being as viewed from the left side of the vehicle, said side being taken as viewed from the rear.

Figure 7 is a fragmentary partially broken illustration of an automatic clutch pedal actuating mechanism, said structure being viewed from the righthand side thereof.

Figure 8 is a top fragmentary view of the structure shown in Figure 7 further illustrating the relationship of the parts.

For the purposes of convenience in description, the terms "upper," "lower," and derivatives thereof, will have reference to the structure embodying the invention as shown in Figure 1. The terms "front," "rear," and derivatives thereof, will have reference to the left and right ends, respectively, of the structure shown in Figure 1. The terms "inner," "outer," and derivatives thereof, will have reference to the geometric center of the structure shown in Figure 1 and parts thereof. The term "manual" may include both hand and foot operations where the context permits.

General description

In order to carry out the purposes set forth above, as well as others related thereto, there is provided an engine 15 connected in a conventional manner through a clutch 12 and a transmission 14 to an output shaft 29. A clutch pedal 11 operates to release the clutch 12 and a shift lever 13 selects the desired ratios in the transmission 14. The shift control mechanism 10 comprises a two-part, articulated shift lever wherein the lower part functions in a normal manner and the upper part moves with respect to the lower part for operating a pressure fluid valve in response to the manual pressure applied during a normal shifting operation. Linkage is provided between the clutch pedal and the clutch operating mechanism. A piston and cylinder mechanism responsive to pressure fluid is provided for actuating the clutch, preferably without also moving the clutch pedal. Actuation of said valve by a shifting operation introduces pressure fluid into said cylinder to move the piston in a clutch opening direction. Foot actuation of the clutch pedal whenever the pressure system is deenergized operates independently to disconnect the clutch.

Detailed construction

As shown in Figure 1, the transmission 14 has an input shaft 21, which is connected to the clutch 12 for normal driving by the crankshaft 22 of the engine 15. The input shaft 21 of said transmission 14 is continuously engaged with the countershaft 23, in a substantially conventional manner, through the gears 24. The output shaft 25 is either directly connectible to the input shaft 21 by the shift member 32, or indirectly connectible to said input shaft through the countershaft 23 by means of one of the shiftable gear sets 26, 27 and 28, in a substantially conventional manner. The output shaft 25 may be connected to a propeller shaft 29 by means of a suitable coupling 31 for driving a vehicle, not shown, in which the transmission 14 is installed. The gear sets 26, 27 and 28, or the direct coupling between shafts 21 and 25 are selected in a conventional manner by shiftable members 32 and 33, which are moved axially along the output shaft 25 by means of the shift yokes 34 and 35, respectively. Said shift yokes are, in turn, connected to shift bars 36 and 37, respectively, for selective movement by the shift lever 13, in a conventional manner. This representation of a particular transmission structure is for purposes of illustration only and should not be taken in any sense as limiting. It will be apparent as the description progresses that the device of the invention may be used with a wide range of different types of transmissions and, in fact, may be used with practically any change gear arrangement normally utilizing a manually operated shift lever and a foot operated clutch.

The clutch 12 (Figure 2) is disengaged in this particular embodiment when the crank arm 38 on the clutch 12 is moved upwardly from its solid line position to its broken line position 38' (Figure 2). The free end of said arm 38 is connected by linkage 39 to the clutch pedal 11, which, when operated in a conventional manner, effects said upward movement of said arm 38. The linkage 39 includes a rod 41 pivotally secured at its lower end to the free end of the arm 38 and rigidly secured at its upper end to the housing 42 of a pressure actuated cylinder 43. The upper end of the piston rod 44 of the pressure cylinder 43 is pivotally connected to the free end of a crank arm 45, which is mounted upon a clutch pedal shaft 46 upon which the clutch pedal 11 is secured, and which is rotated by operation of the clutch pedal. Thus, operation of the clutch pedal 11, in effecting rotation of the shaft 46, causes the piston rod 44 to be moved upwardly. A clutch pedal stop 47 limits movement of the clutch pedal 11 in a direction of rotation of the shaft 46 counter to that which effects upward movement of the piston rod 44. The return spring within the clutch (not shown) effects a constant downward urging of the arm 38. Thus, when the clutch pedal 11 is bearing against the pedal stop 47 and the clutch 12 is engaged, the piston rod 44 will be normally fully extended, as shown in Figure 2, and the piston 48 secured to said piston rod within said cylinder housing 42 will be at the upper end of its stroke. Movement of the clutch pedal 11 in a counterclockwise direction, as appearing in Figure 1, will effect a disengagement of the clutch 12.

The shift lever 13 (Figures 2 and 3) is comprised of upper and lower segments or parts 51 and 52, which are pivotally connected to each other by means of the joint 53 for limited movement with respect to each other about an axis which, in this embodiment, is preferably substantially horizontal and transverse of the lengthwise extent of the shift bars 36 and 37. Actually, however, whatever the direction of movement of the shift lever with respect to the vehicle as the shift lever moves from a shifted position to neutral, the movement of the upper segment 51 with respect to the lower segment 52 will be in the same direction. In normal vehicle installations, this direction will, of course, normally be longitudinally of the machine in which the transmission is installed, but in special uses, especially for non-vehicular use, other directions of movement are possible.

The joint 53 is comprised of a substantially cylindrical knob 54 of relatively short axial length secured to the upper end of the lower part 52, and a substantially cylindrical cap 55, which snugly embraces the knob 54 and is secured to the lower end of the upper part 51 of said lever 13. The cap 55 has a slot 56 in its periphery 60, remote from said upper part 51, which is elongated peripherally of said cap. The lower part 52 extends through said slot, the ends of which provide the limitation upon the movement of the upper part 51 with respect to the lower part 52 of said lever. Resilient means, such as the leaf springs 57 and 58, are secured to opposite sides of the periphery of the cap 55 and bear against opposite sides of the adjacent end of the lower part 52 of the lever 13. Said springs are designed to resist movement of said upper part 51 with respect to said lower part 52 substantially equally in both directions and tend, therefore, to retain said parts in a medial, co-axial position with respect to each other.

The lower part 52 of the lever 13 is provided with a central passageway 59, which communicates at its lower end with a tube 61 connected to a source 62 of differential pressure, which may be either a positive or a negative pressure. Said passageway 59 is divided at its upper end to provide two, spaced exits 63 and 64 through the periphery of said knob 54. An opening 65 is provided through the cap 55 and is connected to a tube 66 which communicates with the interior of the cylinder housing 42 through one end or the other, depending upon whether positive or negative pressure is to be utilized. As shown in Figure 2, positive pressure is used, as the tube 66 is connected through the upper wall 67 of said cylinder. Thus, the passage of a fluid under pressure through the tube 66 will act against the piston 48 and tend to urge said housing upwardly with respect to the piston 48 as indicated in broken lines at 42a in Figure 2. Where vacuum or negative pressure is utilized, then the tube 66 will communicate with the interior of the cylinder housing 42 through the lower wall 68 of said housing as shown in Figure 5.

The periphery 69 (Figure 4) of the knob 54 is provided with a transverse groove 70, which is disposed midway between the exits 63 and 64 and will communicate with the opening 65 in the cap 55 when said upper part 51 is in said medial position with respect to the lower part 52 of said lever 13. The groove 70 also communicates with an external port 71 through the side wall 72 of the cap 55 when said groove communicates with the opening 65. The slot 56 limits movement of said upper part 51 from one position where the exit 63 of the passageway 59 communicates with the tube 66 to another position where the exit 64 communicates with said tube 66.

If desired, mechanism may be provided for preventing relative movement between the parts 51 and 52 of the shift rod 13 at the will of the operator and thereby converting the system into an entirely conventional operation. This may be done in any of many apparent ways. One convenient device includes a control button 81 connected to a pin 82 supported in a block 83, which block is in turn supported in any convenient manner, as by a screw 86, rigidly with respect to the cap 55. The pin 82 is receivable into an opening 84 in the knob 54. Suitable detent mechanism 85 is provided for holding the rod 82 in either an upper or lower position according to the setting desired and effected by the operator.

Operation

In normal, clutch engaged, position of the mechanism, the block 47 will limit the clockwise (as appearing in Figure 2) rotation of the shaft 46 and thus will limit the downward movement of the piston rod 44. The clutch spring holding the clutch plates in engagement with each other will also hold the cylinder 42 in its full downward position and, if properly adjusted, the upper wall 67 of the cylinder 42 will be in light contact against the lower end of the piston rod 44. Thus, depression of the clutch pedal 11 in a conventional manner will cause a lifting of the piston rod 44 which will act directly against the upper wall 67 of the cylinder 42 and transmit a lifting force directly through the link 41 and the mechanism connected thereto to the clutch for effecting a disconnecting thereof. This operation can be performed at any time desired by the operator, and can be employed in a fully conventional manner for any purpose requiring foot operation of the clutch, as for starting the vehicle from a standstill, for slipping the clutch in working the vehicle around a dock, or for stopping the vehicle under conditions where the transmission is left in the shifted position. It will be seen from the foregoing that under these conditions, and particularly when feathering or other slipping of the clutch is required, it can be operated by foot by the operator in an entirely conventional manner and hence will not require any change on the part of the operator from his present method of performing these operations.

However, where a shifting operation is effected while the vehicle is in motion, the disconnecting and reconnecting of the clutch normally incident to shifting the transmission may when desired be effected automatically in response to normal manual shifting movement of the shift lever 13.

For example, if the gears 27 (Figure 1) are engaged with the output shaft 25 and it becomes desirable to engage the gears 26, this is accomplished by first manually grasping the shift lever 13 in the usual manner and moving said lever toward the neutral position. Assuming that this requires a leftward movement of the upper part 51 of the lever 13, as appearing in Figure 3, said upper part will first move counterclockwise about the pivot axis of the joint 53 provided by interengagement of the cap 55 and the knob 54. This pivotal movement, which will be resisted by the spring 57, will continue until the leftward end of the slot 56 engages the lower part 52 of the lever 13, whereupon the tube 66 will be in communication with the exit 63 of the passageway 59. Pressure fluid from the source 62 will then flow through said tubes 61 and 66 into the upper end of the cylinder housing 42. Since the lower end of the clutch pedal 11 engages the pedal stop 47, thereby preventing downward movement of the piston 48, the cylinder housing 42 will be urged upwardly with respect to said piston 48, thereby actuating the linkage elements 41 and 38 and disengaging the clutch 12. The upper side of the piston 48 thus becomes a movable wall of the expansible chamber into which the pressure fluid enters, regardless of whether the pressure connection is positive or negative, and the lower side of the upper end 67 of the cylinder becomes the reaction wall, and such terminology will for convenience be hereinafter utilized in the appended claims.

Thus, whether or not the operator releases the accelerator before he operates the shift lever, the disengaging of the clutch will terminate the application of torque through the clutch 12 to the transmission 14 and a shifting of the transmission into the neutral position can and will occur very quickly upon the continued application of a shifting pressure to the shift lever 13.

As soon as the gear shift lever 13 reaches the neutral position, the operator may momentarily release his pressure against the upper part 51, whereupon the spring 57 will cause said upper part to return to its medial position, as shown in Figure 3, thereby connecting the tube 66 to the port 71 and exhausting the pressure cylinder 43 for permitting the clutch 12 to return to its normally engaged position. This will again connect the crankshaft 22 through the input shaft 21 with the countershaft 23 whereby the countershaft portions of said gear sets 24, 26, 27 and 28 will again be driven by said engine 15. If the operator properly accelerates the engine in the case of a downshift, or if he simply lets the engine speed drop in the case of an upshift, the input side of the transmission may in a known manner be caused to rotate at the speed necessary to effect the substantial synchronization needed prior to shifting said transmission into the next gear position. This will normally be accomplished readily by any reasonably skilled driver in a manner already conventional and commonly practiced with standard double clutching procedures utilizing a foot actuated clutch. The operator judges the engine speed either by the sound of the engine or he can control it by using the tachometer normally provided on truck instrument panels. This latter is particularly true on large trucks, where the problem is normally the most serious. In all cases, the shift will be initiated at such a speed that when it is completed the engine will be operating as close as possible to the desired speed. For example, if the desired speed of rotation is 1800 r.p.m. and a truck is climbing a grade, the driver will wait until the load has brought the engine speed down to such a point, in view of the shift ratios involved, that the next desired shift will, without material change in the truck's ground speed, bring the engine speed back up to 1800 r.p.m. Thus, the accelerator can be held down continuously from the beginning of the shift, or depressed immediately after reaching neutral, so that the engine speed is up to the desired 1800 r.p.m. by the completion of the pause time at the midpoint of the shifting operation. In an upshift, corresponding reduction of engine speed will be used and effected in a known manner.

The input shaft 21 is now running at a speed corresponding to its speed in the new shifted position and the gears to be engaged are running at substantially equal speeds.

Shifting into the next gear position may now be accomplished quickly and for illustrative purposes, may be assumed to require a continued movement of the shift lever 13 leftwardly. Resumption of manual pressure on the upper part 51 of lever 13 in a leftward direction again effects communication of the tube 66 with the exit 63 of the passageway 59, thereby actuating the pressure cylinder 43 in the same manner as described hereinabove with respect to movement of the shift lever 13 into the neutral position. This will again declutch the transmission 14 and the lever may then continue to move the transmission into the new shifted position.

It then being desirable to re-engage the clutch as soon as possible, the shift lever 13 is released and the spring 57 returns the lever upper part 51 into said medial position, thereby connecting the tube 66 to the exhaust port 71. This permits the exhaust of the pressure cylinder 43 and an immediate return of the clutch 12 into the engaged position before either of the shafts 21 or 22 have materially changed speed.

It being important that the re-engagement of the clutch takes place before the shafts 21 and 22 materially change speed, it will be seen that the feathering of the clutch, which previously was widely accepted as essential for all automatic, or semi-automatic, clutch operations, is here not only unnecessary but rather is actually undesirable. If feathering occurred, it would create a time delay before actual re-engagement which would permit said shafts to get out of synchronism. Thus, a rapid and certain re-engagement is essential and no feathering can be permitted. Accordingly, the exit groove 70 is made with at least as much capacity as the passageway 65 and all of these passageways are of sufficient capacity that depressurizing of the cylinder mechanism 43 takes place practically instantly and the clutch is thereby permitted to re-engage as promptly as is mechanically possible.

Shifting in a reverse direction, that is, rightwardly as appearing in Figure 3, involves similar steps. Pressure on the upper part 51 of the shift lever 13 in a rightward direction moves the cap 55 clockwise with respect to the knob 54 and connects the passageway 59 through the exit 64 to the tube 66 and thereby again pressurizes the cylinder 43 for disconnecting the clutch 12. As soon as pressure is removed from the upper part 51 of the shift lever 13 upon reaching neutral position, the spring 58 again returns the upper part 51 to its medial position and connects the tube 66 through the groove 70 to the atmosphere, thereby removing pressure fluid from the cylinder 43 and permitting re-engagement of the clutch. Renewed rightward pressure on the lever upper part 51 will again first disengage the clutch in the same manner as just mentioned and then move the transmission from neutral into a shifted position. After the shift is completed, removal of manual pressure from the lever upper part 51 will again deenergize the cylinder 43 and permit re-engagement of the clutch.

It will be recognized also that where a shift sequence consists of combined rightward and leftward movements of the shift lever as appearing in Figure 3 (forwardly and rearwardly as appearing to the driver) these operations may be effectively carried out also.

At any time that it is not desired to use the automatic clutch control mechanism but instead to operate the shift lever in a strictly conventional manner, such as where the vehicle is operating in heavy traffic so that starts from a standstill constitute a major number of the vehicle controlling operations, the same may be accomplished merely by depressing the button 81 and thereby preventing relative movement between the parts 51 and 52 of the shift lever 13 and maintaining the conduit 66 connected to the atmosphere. Resumption of automatic clutch control may be easily and quickly accomplished by again raising the button 81.

While the foregoing has assumed that no synchronizers will be used, and none will normally be needed, it should be clearly understood that their use, if desired, is entirely possible without changing the function or advantages of the apparatus of the invention or its mode of operation as herein described.

*Modification*

Figures 6 to 8 illustrate a modification of the invention in which the basic purposes of the invention are accomplished but in which certain of the secondary objectives are not accomplished. Since most of the parts have exact counterparts in the device illustrated in Figures 1 to 5, inclusive, detailed description of the form shown in Figures 6 and 8 is unnecessary and will not be presented. However, the parts appearing in Figures 6 to 8 have been numbered with numerals corresponding to the parts appearing in Figures 1 to 5, inclusive, with the letter "*a*" added thereto, and hence the description of Figures 1 to 5 will largely apply also to Figures 6 to 8.

The principal difference between the form shown in Figures 1 to 5, inclusive, and the form shown in Figures 6 to 8 is that the cylinder 42a does not appear in the pedal-to-clutch linkage as in Figures 1 to 5, but rather is mounted separately. Thus, the clutch pedal 11a is connected through its crank 45a and a link 91 which actuates the arm 38a, said arm being freely rotatable on the clutch pedal shaft 35a. The arm 38a bears against the screw 86 which is mounted on an arm 87 and said arm 87 is rotatable with the shaft 30a. Thus, depression of the clutch pedal 11a causes a counterclockwise rotation (as appearing in Figure 6) of the clutch pedal shaft 30a and consequent releasing of the clutch in the usual manner.

Turning now to Figure 7, pressurizing of the conduit 66a in the manner described above in connection with Figures 1 to 5, inclusive, will effect a pressurizing of the cylinder 42a and extension of the link 41a. Said link is of adjustable length and is connected to an arm 92, which arm is affixed to the end of the clutch pedal shaft 30a opposite the end of said clutch pedal shaft at which the arm 38a is affixed. Thus, pressurizing of the conduit 66a will cause an extension of the rod 41a and a movement of the clutch pedal shaft 30a in a clockwise direction (as viewed in Figure 7) for effecting a release of the clutch. It will be recognized that motion of the clutch pedal shaft in a clockwise direction as appearing in Figure 7 corresponds to counterclockwise motion of said clutch pedal shaft as appearing in Figure 6. This results merely in movement of the screw 86 away from the arm 38a and hence release of the clutch in response to actuation of the cylinder 42a will not result in movement of the clutch pedal 11a.

Movement of the part 51a at the upper end of the shift lever 53a will, in the same manner as above set forth in detail in connection with the embodiment of Figures 1 to 5, inclusive, effect first a pressurizing of the cylinder 42a and consequent release of the clutch, and continued pressure on said shift knob 40a will then effect movement of the entire shift lever 53a and movement of the parts out of a shifted position toward neutral. Pausing in neutral will permit the part 51a of the shift lever to resume its medial position with respect to the lower part 52a and effect a depressurizing of the cylinder 42a and consequent re-engagement of the clutch. Further procedures and results correspond in all respects to the description given above in connection with Figures 1 to 5 and do not need to be repeated and reference is invited thereto for a further and full understanding of the method of operation of the modifications of Figures 6 to 8.

Although a particular, preferred embodiment of the invention has been set forth above in detail for illustrative purposes, it will be understood that variations or modifications thereof, which lie within the scope of such disclosure, are fully contemplated unless specifically stated to the contrary in the appended claims.

We claim:

1. A mechanism for operating a clutch in the power transmission apparatus of a vehicle, said apparatus including a change speed gear system shiftable between neutral and shifted positions, comprising in combination: a two-part articulated shift lever for shifting said change speed gear system between neutral and shifted positions, said parts being movable with respect to each other between first and second extreme positions and through a medial position, the relative movement of said parts being in the same general direction as the direction of movement of the lever when moving between neutral and a shifted position; a valve for pressure fluid included within said lever and having an inlet and at least one outlet, and having a closed position and at least two outlet positions, said valve being in closed position when said parts of said lever are in said medial position, and said valve being in either, respectively, of said two outlet positions when said parts are in either extreme position; resilient means constantly urging said parts into said medial position; a first conduit connected to said inlet and connectible to one side of a source of fluid pressure differential within said vehicle; a pressure responsive cylinder having relatively movable housing and piston elements, one of said elements being connected to said clutch for disconnecting same upon pressurizing of said cylinder; a second conduit communicating at one end with said valve outlet in both of said outlet positions and communicating at its other end with said cylinder for pressurizing same upon movement of said valve into either outlet position; an exhaust port within said valve for connecting said second conduit to the other side of said pressure differential, said valve connecting said second conduit with said exhaust port when said shift lever parts are in said medial position, the passageway from said second conduit to said exhaust port being at least as large throughout its entire length as the passageway from said inlet to said second conduit, whereby the cylinder will become depressurized very quickly upon return of said shift lever parts to their medial position and the clutch will be permitted to reengage as rapidly as is mechanically possible.

2. A mechanism for operating a clutch in the power transmission apparatus of a vehicle, said apparatus including a change speed gear system shiftable between neutral and shifted positions, comprising in combination: a two-part articulated shift lever for shifting said change speed gear system between neutral and shifted positions, said parts being movable with respect to each other between first and second extreme positions and through a medial position, the relative movement of said parts being in the same general direction as the direction of movement of the lever when moving between neutral and a shifted position; a valve for pressure fluid included within said lever at the junction between said two parts and operable by relative motion between said two parts in a first plane and having an inlet and at least one outlet, and having a closed position and at least two outlet positions, said valve being in closed position when said parts of said lever are in said medial position, and said valve being in either, respectively, of said two outlet positions when said parts are in either extreme position; resilient means constantly urging said parts into said medial position; a first flexible conduit extending along said shift lever and connected to said inlet and connectible to one side of a source of fluid pressure differential within said vehicle; a pressure responsive cylinder having relatively movable housing and piston elements; one of said elements being connected to said clutch for disconnecting same upon pressurizing of said cylinder; a second flexible conduit communicating at one end with said valve outlet in both of said outlet positions and extending along said shift lever for communicating at its other end with said cylinder for pressurizing same upon movement of said valve into either outlet position; an exhaust port within said valve for connecting said second flexible conduit to the other pressure side of said source of pressure differential, said valve connecting said second flexible conduit with said exhaust port when said shift lever parts are in said medial position, the passageway from said second flexible conduit to said exhaust port being at least as large throughout its entire length as the passageway from said inlet to said second conduit, whereby the cylinder will become depressurized very quickly upon return of said shift lever parts to their medial position and the clutch will be permitted to re-engage as rapidly as is mechanically possible.

3. A mechanism for operating a clutch in the power transmission apparatus of a vehicle, said apparatus including a change speed gear system shiftable between neutral and shifted positions, comprising in combination: a clutch operating shaft extending out first and second opposite sides of the clutch housing; a clutch pedal and linkage connecting said clutch pedal to the first end of said shaft whereby actuation of the clutch pedal will effect connection or disconnection of the clutch; a two-part articulated shift lever, said parts being movable with respect to each other between first and second extreme positions and through a medial position, the relative movement of said parts being in the same general direction as the direction of movement of the lever when moving between neutral and a shifted position; a valve for pressure fluid included within said lever and having an inlet and at least one outlet, and having a closed position and at least two outlet positions, said valve being in closed position when said parts of said lever are in said medial position, and said valve being open in either, respectively, of said two outlet positions when said parts are in either extreme position; resilient means constantly urging said parts into said medial position; a first conduit connected to said inlet and connectible to one side of a source of fluid pressure differential within said vehicle; a pressure responsive cylinder having relatively movable housing and piston elements, one of said elements being connected to the second end of said clutch operating shaft for disconnecting said clutch upon pressurizing of said cylinder; a second conduit communicating at one end with said valve outlet in both of said outlet positions and communicating at its other end with said cylinder for pressurizing same upon movement of said valve into either outlet position; an exhaust port within said valve connecting said second conduit to the other side of said source of pressure differential, said valve connecting said second conduit with said exhaust port when said shift lever parts are in said medial position, the passageway from said second conduit to said exhaust port being at least as large throughout its entire length as the passageway from said inlet to said second conduit, whereby the cylinder will become depressurized very quickly upon return of said shift lever parts to their medial position and the clutch will be permitted to re-engage as rapidly as is mechanically possible.

4. Clutch control mechanism for disengaging a clutch operably positioned serially between a prime mover and a manually shiftable transmission, comprising: a clutch pedal; linkage operably connecting said clutch pedal to the clutch, said linkage including a pressure cylinder having a movable wall and an opposed reaction wall, said linkage causing said walls to bear mechanically against each other for transmitting force therebetween when said cylinder is de-energized and is functioning merely as a linkage, whereby to effect disengagement of said clutch in response to movement of said pedal; a jointed shift lever, and hinge means permitting limited movement of one part of said lever with respect to the other; resilient means resisting said movement; a source of differential pressure; valve means having an inlet connected to said source and having an outlet connected to said cylinder; means for shifting said valve in response to relative movement of the parts of said lever to connect said inlet and said outlet, whereby said cylinder is pressurized when said lever is moved against the urging of said resilient means, and said walls are separated as a result of said pressurizing and thereby actuate at least a portion of said linkage for disengaging said clutch.

5. The device defined in claim 1 including a clutch pedal for operating said clutch; a first linkage connected to said clutch pedal; a second linkage connected to said clutch, said first and second linkages being so related to each other that a depressing movement of the pedal moves the first linkage and the second linkage in a clutch disengaging direction, the movable one of said housing and piston elements being connected to said first linkage and the other of said housing and piston elements being connected to said second linkage and defining a reaction wall, and the parts so related that when the clutch is in engaged position, the movable one of said elements is normally in substantial contact with said reaction wall, whereby movement of said clutch pedal will operate through said first linkage to cause said movable one of said elements to bear mechanically against said reaction wall and thence operate said second linkage to effect a disengagement of said clutch; and wherein, also, pressurizing of said cylinder will introduce pressure fluid between the movable one of said elements and said reaction wall and thereby move said reaction wall with respect to said movable one of said elements in a clutch disengaging direction, and means holding said movable one of said elements against motion in a direction opposite to that caused by normal actuation of the clutch pedal.

6. Clutch control mechanism for disengaging a normally resiliently engaged clutch, operably positioned serially between a prime mover and a manually shiftable transmission, comprising: a clutch pedal; first linkage connected to said clutch pedal; means operatively connected to one of said first linkage and said clutch pedal for positively preventing movement of said clutch pedal in one direction and permitting movement thereof in a second direction; second linkage mechanism connected to said clutch and movable for disengaging said clutch against said resiliency; means including a pressure cylinder having a movable wall and a reaction wall therein interposed between and connected to each of said first linkage and said second linkage, one of said walls being connected to one of said linkages and the other of said walls being connected to the other of said linkages, operation of said pedal in said second direction causing said walls to bear against each other for transmitting mechanical force from said pedal to said second linkage in a clutch disengaging direction; an articulated shift lever; a valve in said shift lever and having an inlet port and an outlet port; means connecting said outlet port to said pressure cylinder; a source of fluid pressure and means connecting same to said inlet port; means responsive to articulation of said lever for shifting said valve to place said inlet and outlet ports in communication for introducing pressure fluid between said walls for causing the one of said walls which is connected to said second linkage to move away from the other of said walls in a direction for transmitting clutch disengaging movement of said second linkage.

7. The device defined in claim 6 wherein said shift lever includes lost motion mechanism between the portion thereof to which manual pressure is applied and the portion thereof applying shifting force to the shiftable portion of the transmission, and means connecting the portion thereof initially movable in response to manual pressure applied to said valve for actuating it in response to manual pressure applied to said shift lever prior to actuation of shift effecting mechanism.

8. The device defined in claim 6 wherein said cylinder comprises a housing having a piston therein, said piston being connected to the first linkage structure and the housing being connected to the second linkage structure.

9. The device defined in claim 6 having sufficiently unrestricted depressurizing means in operative association with said cylinder that upon depressurizing thereof said clutch will re-engage substantially at once.

10. A mechanism for operating a clutch in the power transmission apparatus of a vehicle, including in combination: an articulated shift lever, said shift lever having a pair of relatively movable parts; a valve on said shift lever, said valve having an inlet port and an outlet port and having a closed position wherein said inlet and said outlet ports do not communicate and an open position wherein said inlet and outlet ports do communicate; means for normally placing said valve in its closed position; means connecting said valve to said shift lever, whereby said valve is placed in its open position upon movement of one of said movable parts of said shift lever with respect to the other movable part; a pressure source and means connecting same to said inlet port of said valve; a cylinder and a piston slidably disposed in said cylinder; means connecting one of said piston and cylinder to said clutch and means for holding the other of said piston and cylinder relatively stationary when fluid is admitted into said cylinder, whereby said clutch may be actuated upon admission of fluid to said cylinder; and means connecting said outlet port to said cylinder, whereby fluid is admitted to said cylinder when said valve is in its open position.

11. A mechanism for operating a clutch in the power transmission apparatus of a vehicle, including in combination; an articulated shift lever, said shift lever including a relatively short upper member having a hand grip thereon and an elongated lower member pivotally connected to said upper member; a valve within said shift lever including means within said lower member defining an inlet port and an exhaust port, said valve also having at least one outlet port; means on said upper member for bringing said inlet port into communication with said outlet port and thereby providing an open position for said valve upon pivotal movement of said upper member with respect to said lower member; means for normally placing said outlet port in communication with said exhaust port in the closed position of said valve; a pressure source and means connecting same to the inlet port of said valve; fluid pressure actuated means connected to said clutch for actuating same; and means connecting the outlet port of said valve to said fluid pressure actuated means for supplying fluid pressure thereto and thereby actuating said clutch when said valve is in its open position.

12. A mechanism for operating a clutch in the power transmission apparatus of a vehicle, including in combination: an articulated shift lever including pivotally connected upper and lower members; a valve in said shift lever between said upper and lower members, said valve including an inlet port, an exhaust port and an outlet port;

valve operating means on said upper member whereby, upon relative pivotal movement of said upper and lower members of said shift lever, said valve may be operated to bring said inlet port and said outlet port into communication and thereby providing an open position for said valve; means for normally placing said valve in a closed position wherein said outlet port communicates with said exhaust port; a pressure source and means connecting same to the inlet port of said valve; fluid pressure actuated means connected to said clutch for actuating same; and means connecting the outlet port of said valve to said fluid pressure actuated means for supplying fluid pressure thereto and thereby actuating said clutch when said valve is in its open position.

References Cited in the file of this patent

UNITED STATES PATENTS

| | | |
|---|---|---|
| 2,074,476 | Kolb | Mar. 23, 1937 |
| 2,079,822 | Serra | May 11, 1937 |
| 2,733,799 | Williams | Feb. 7, 1956 |

OTHER REFERENCES

Dyke's Automobile Encyclopedia, 22nd edition, published 1950, page 632.